United States Patent [19]

Russo et al.

[11] Patent Number: 4,693,515
[45] Date of Patent: Sep. 15, 1987

[54] HEADREST FOR AN AUTOMOTIVE VEHICLE SEAT

[75] Inventors: Vincent Russo, Cary, N.C.; Max O. Heesch, Brooklyn, Mich.

[73] Assignee: ITT Corporation, New York, N.Y.

[21] Appl. No.: 923,335

[22] Filed: Oct. 27, 1986

[51] Int. Cl.$^4$ .............................................. A47C 1/10
[52] U.S. Cl. .................................. 297/391; 297/284; 297/408; 297/409; 297/410
[58] Field of Search ............... 297/408, 409, 391, 410, 297/284

[56] References Cited

U.S. PATENT DOCUMENTS

| | | | |
|---|---|---|---|
| 3,427,073 | 2/1969 | Downs et al. | 297/410 X |
| 3,592,508 | 7/1971 | Druseikis | 297/410 |
| 3,738,706 | 6/1973 | Caldemeyer | 297/410 |
| 4,514,010 | 4/1985 | Gonzales | 297/284 |

FOREIGN PATENT DOCUMENTS 2932345 2/1981 Fed. Rep. of Germany ...... 297/410

Primary Examiner—James T. McCall
Attorney, Agent, or Firm—James B. Raden; Donald J. Breh

[57] ABSTRACT

A headrest for an automotive vehicle seat is disclosed including a headrest frame including a lower portion extending along an upper exterior portion of the seatback and mounted to a mounting frame for generally pivotable forward and rearward movement. A first track provides for the forward and rearward movement and a bladder mounted between the mounted frame and headrest frame selectively expands and contracts to move the headrest frame along the track. The mounting frame is provided with a elongated portion extending into the interior of the seatback and includes a linear gear operated by a reversible motor driven gear for selectively vertically extending and retracting the headrest.

14 Claims, 8 Drawing Figures

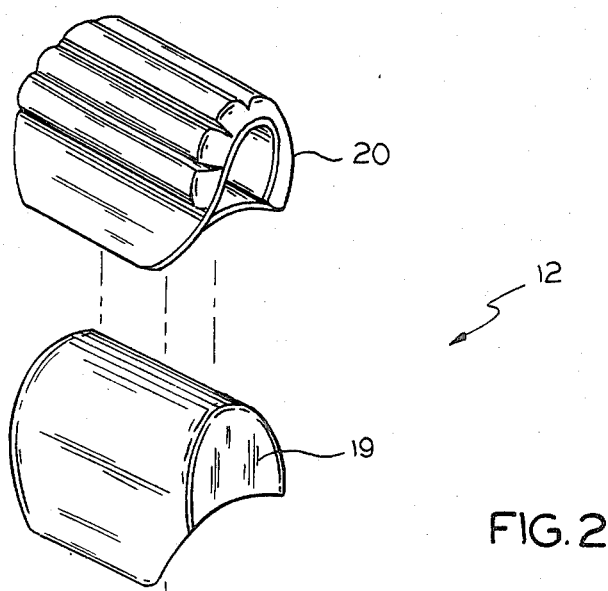
FIG. 2
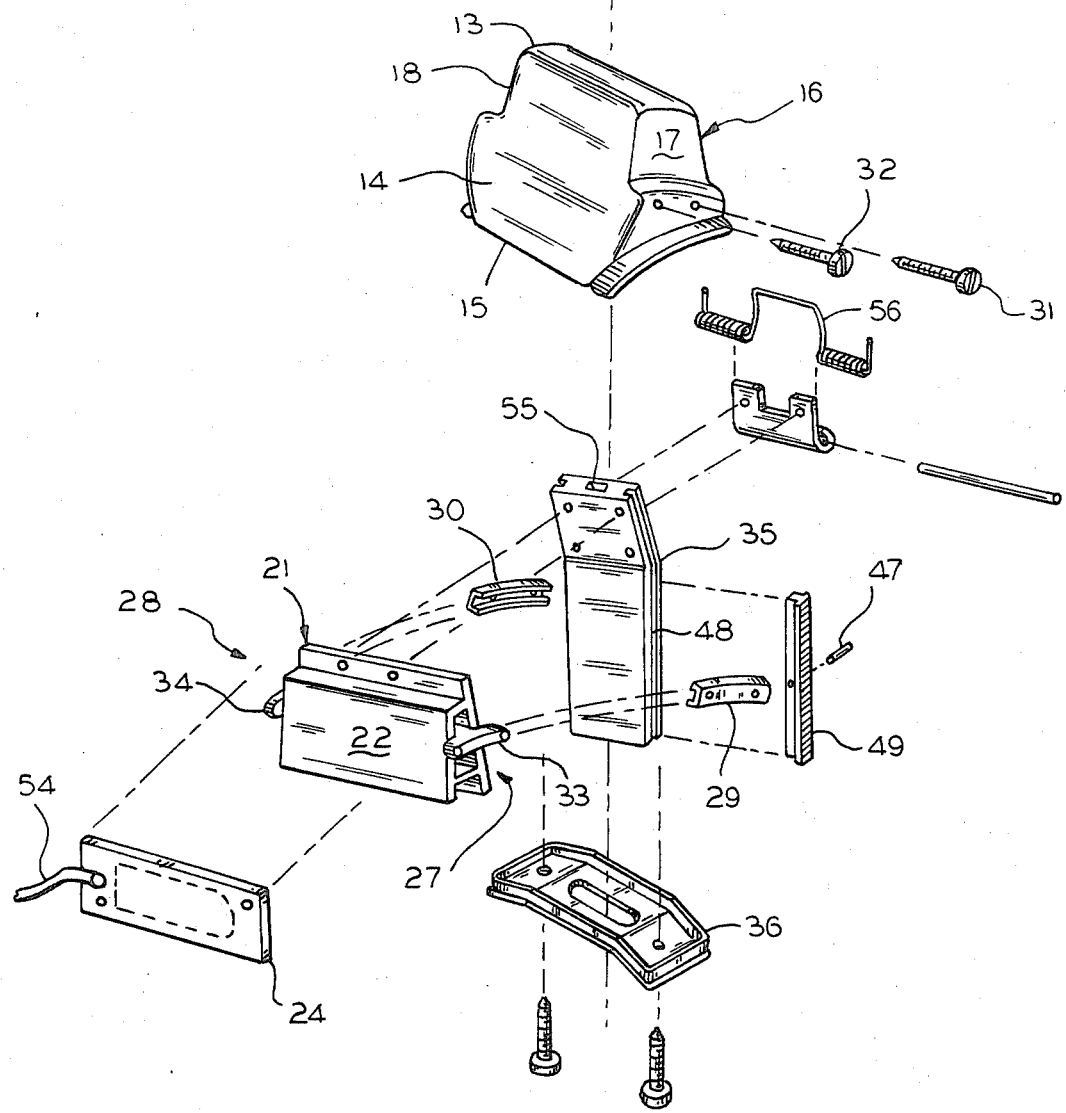

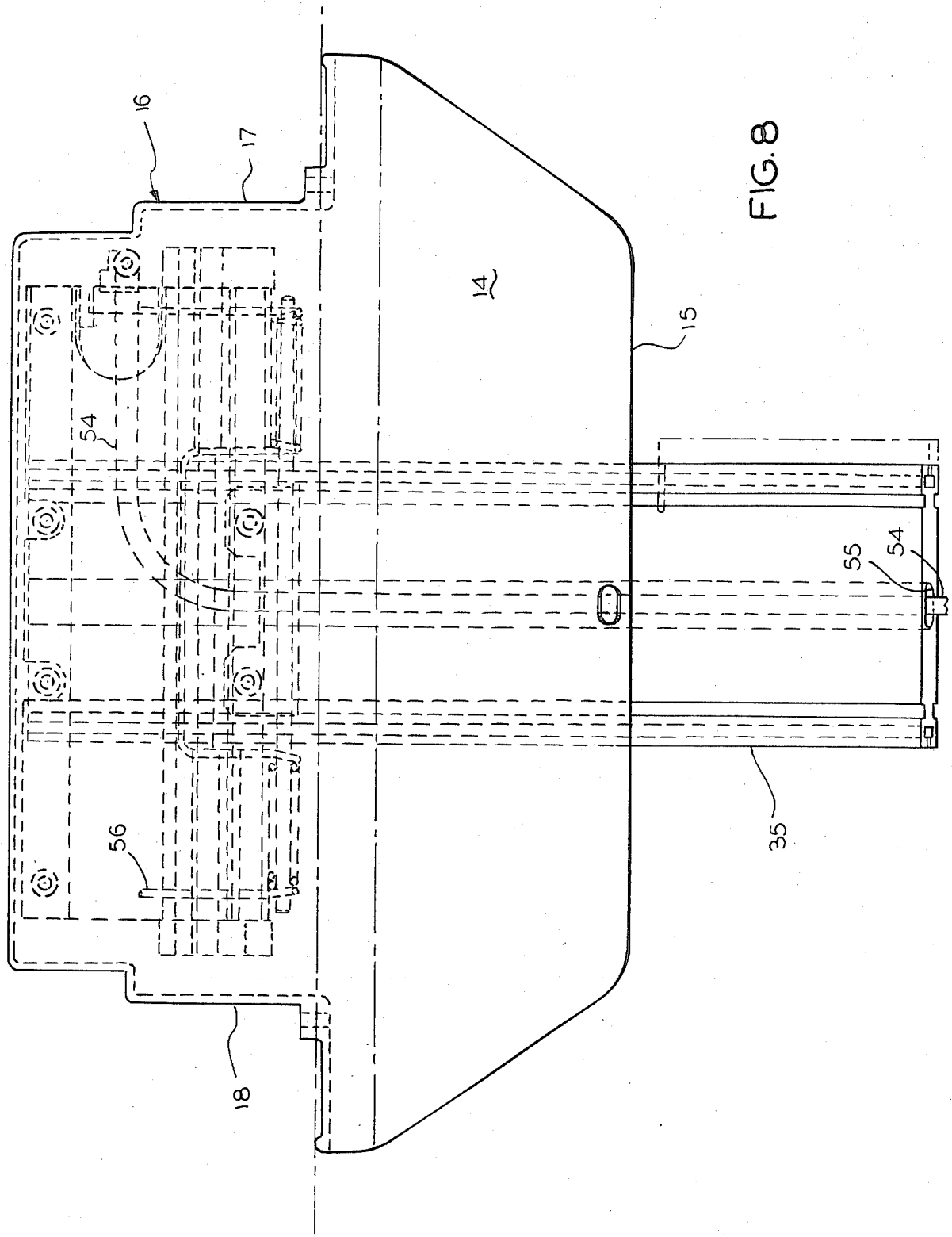

HEADREST FOR AN AUTOMOTIVE VEHICLE SEAT

BACKGROUND OF THE INVENTION:

This invention relates to a headrest for an automotive vehicle seat. More particularly, the invention relates to a headrest that is selectively positionable by the seat occupant to an infinite number of positions in both a vertical direction and a generally horizontal direction relative to the seatback.

Headrests for automotive vehicle seats are well known as are headrests which are adjustable and in particular which are adjustable in a vertical direction. However, heretofore, vertically adjustable headrests left a space or gap between the top of the seatback to which they are attached and the bottom of the headrest when positioned at their maximum up position. Present headrests are also limited in their width in the vertical direction so as to accommodate both maximum extension as well as unobscured occupant vision. That is, heretofore, headrests having great vertical width to offer impact protection tend to obscure occupant vision even when retracted, while a headrest of lesser vertical width for increasing occupant vision tends to compromise effective headrest surface area and requires greater vertical extension to reach an area behind the occupants head.

SUMMARY OF THE INVENTION

The present invention provides for a headrest that includes a lower portion that extends below the top of the seatback along an upper portion of the seatback. Accordingly, when the headrest is raised, the lower portion also raises and eliminates any gap that would otherwise exist between the headrest and top of the seatback. The vertical width of the headrest can therefore be optimized to provide for greater retraction toward the seat so as to reduce obstruction of occupant vision when retracted without compromising headrest surface area for occupant head protection when extended.

According to the invention, an operator controlled reversible motor driven linear track provides for vertical positioning of the headrest at any of an infinite number of vertical positions between extended and retracted positions.

According to a still further important aspect of the invention, another track guides the headrest for movement generally forwardly and rearwardly relative to the seatback in any vertical position of the headrest to any of an infinite number horizontal positions.

A still further important freature provides for the horizontal positioning track to impart a generally pivotable motion to the headrest about its lower transverse edge.

According to the invention, there is provided a headrest frame which is covered with an upholstered padded cover which includes the lower extended portion as well as the main headrest portion.

Another important feature of the invention provides for a mounting frame to be connected to the headrest frame by way of first track means defining the pivotable forward and rearward motion of the headrest.

An expansible-contractable bladder is positioned between the mounting frame and headrest frame to impart the forward movement to the headrest frame when expanded and a spring moves the headrest frame rearwardly when the bladder is contracted.

A still further important fearture of the invention provides for the mounting frame to include a lower elongated portion carrying a linear track-type gear engaged by a motor driven gear for causing the mounting frame to move vertically.

Another feature of the invention includes a second track defining the linear vertical motion of the mounting frame and includes a mounting member having a longitudinal clearance opening within which the elongated lower portion of the mounting frame is slidably guided by interlocking tongues and grooves on the mounting member and elongation portion of the headrest mounting frame.

Another feature of the invention provides for stop means associated with the headrest mounting frame and second track for limiting the linear upward and downward movement of the headrest mounting frame.

BRIEF DESCRIPTION OF THE DRAWING

The invention will be better understood after a reading of the following Detailed Description of The Preferred Embodiment in conjunction with the drawing in which:

FIG. 2 is an exploded pictorial view of the headrest showing the major parts of a preferred embodiment of the invention;

FIG. 8 is a top view of the headrest of FIG. 3 with the padded cover removed showing further details of construction of the headrest;

Figure 1:
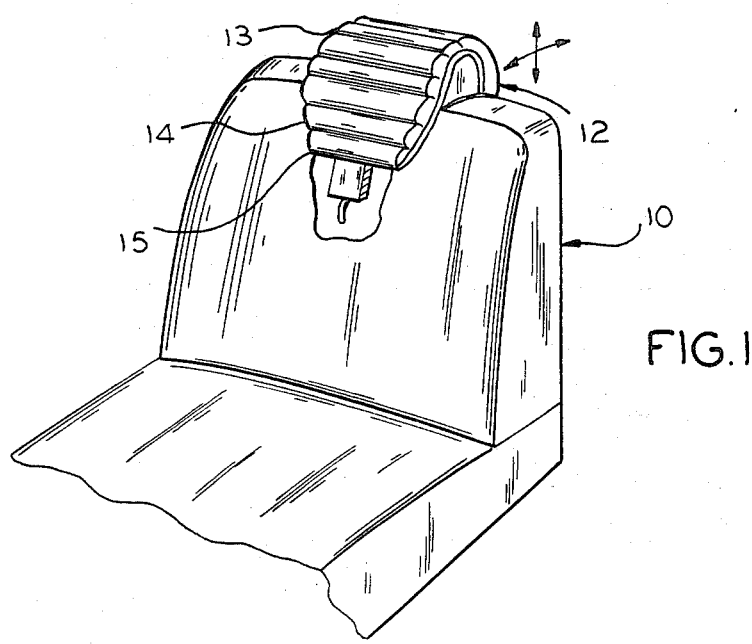
FIG. 1 is a partial cutaway pictorial view of an automobile seat including a headrest according to the invention.
Figure 4:
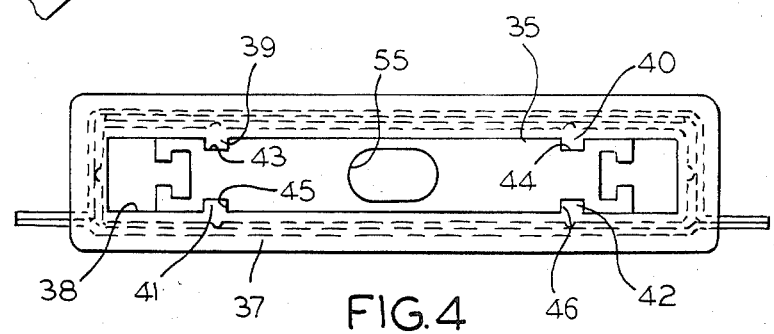
FIG. 4 is a cross-sectional view taken long the line 4—4 in FIG. 3 showing details of construction of the headrest mounting and vertical track.

DETAILED DESCRIPTION OF THE PREFERRED EMBODIMENT:

Shown in FIG. 1 is an automobile seat 10 including a headrest 12 according to the invention which is mounted at the top of the seatback. As described below and shown by the arrows in FIG. 1, the headrest 12 extends and retracts vertically and additionally moves forwardly and rearwardly in a generally pivotable motion.

The headrest includes an upper cushion portion 13 positioned over the top of the seatback and an enlongated lower cushion portion 14 that extends down along an upper portion of the front exterior surface of the seatback with the headrest fully retracted downwardly as shown in FIG. 1. With the headrest fully extended upwardly the lower transverse edge 15 of the lower portion of the headrest remains positioned across the seatback at successively high positions thereby eliminating any gap between the headrest and seatback top when extended. As also described below, the headrest pivots forwardly and rearwardly about the lower edge 15.

Figure 3:
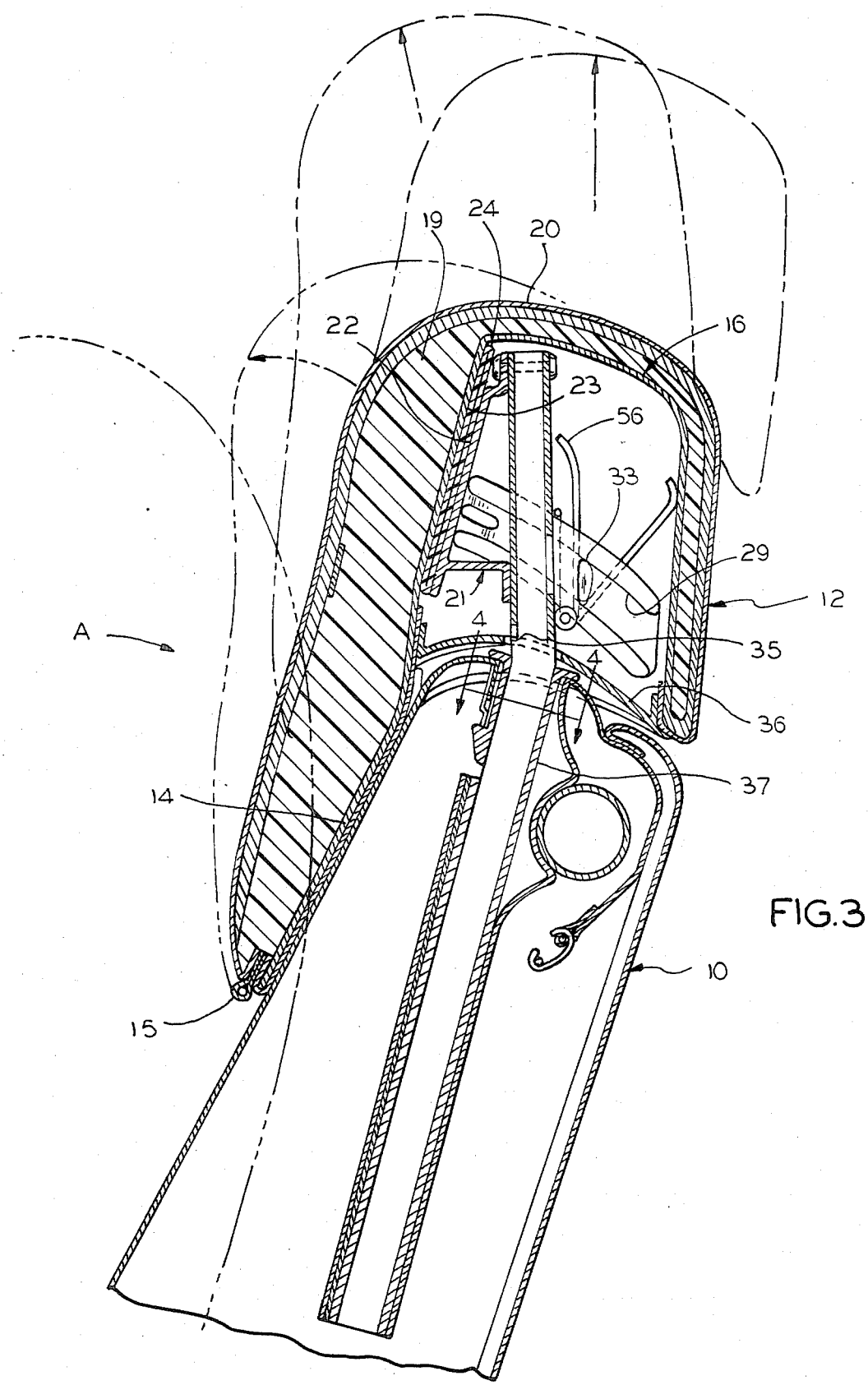
FIG. 3 is a vertical cross-sectional view of the headrest of FIG. 1 and a portion of the seatback to which it is attached showing details of construction and operation.

Referring principally to FIGS. 2 and 3, the headrest 12 includes a headrest frame 16 which is a generally hollow member configured into the general desired shape of the headrest. The headrest frame is provided with opposing sidewalls 17, 18 and the heretofore mentioned elongated lower portion 14. The entire headrest frame is covered with padding 19 and an upholstered cover 20 of appropriate design for the vehicle interior.

A mounting frame 21 is disposed within the interior of the hollow headrest frame 16 and includes a flat bladder support plate portion 22 facing and disposed spaced apart from a similar flat bladder support plate portion 23 of the headrest frame 16. Mounted to the support plate 22 of the mounting frame 21 is a pneumatically expansible-contractable bladder assembly 24 having the bladder abutting the support plate 23 of the headrest frame 16.

As shown best in FIGS. 2 and 3, the headrest frame 16 is connected to the mounting frame 21 by way of a pair of tracks on the opposing sidewalls 17, 18 and ends 27, 28 of the headrest and mounting frame 21. The tracks on each end of the headrest are identical. Each sidewall 17, 18 of the headrest frame is provided with a groove in the form of grooved track elements 29, 30 fastened to the inside surfaces of the sidewalls 17, 18 with screws 31, 32 into which is slidably received complementary shape protrusions 33, 34 provided on the ends of the mounting frame 21. In the embodiment shown, the groove and protrusion configurations are arcuate shaped and define a generally pivotable forward and rearward path of movement for the headrest frame between the fully forward and the fully rearward positions shown in dashed outline form in FIG. 3. The curvature of the arcuate shaped track is dimensioned such that the headrest frame 16 pivots about its lower transverse free edge 15. It can be seen, therefore, that the lower free edge 15 will at all times remain substantially in contact with the seatback as the headrest is pivotably moved forward and rearward, thereby eliminating abrupt surface discontinuities between the seatback surface and headrest at all positions of the headrest.

Figure 6:
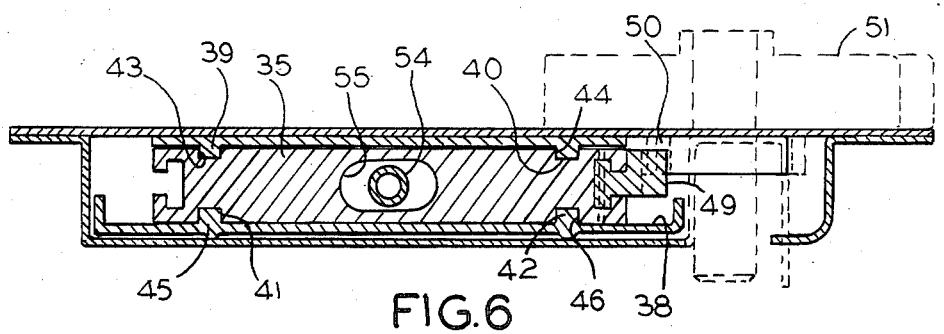
FIG. 6 is a cross-sectional view taken along the line 6—6 in FIG. 5 showing further details of construction of the vertical track and headrest vertical drive structure.
Figure 7:
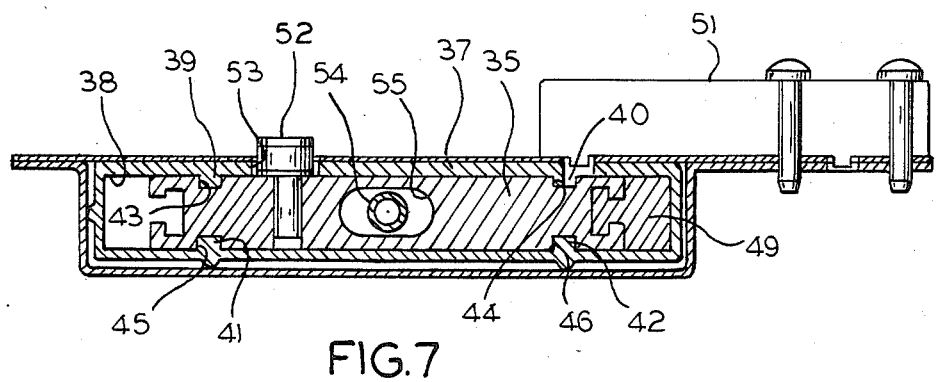
FIG. 7 is a cross-sectional view taken along the line 7—7 in FIG. 5 showing further details of construction of the headrest mounting frame, vertical track, drive structure and vertical position stop.
Figure 5:
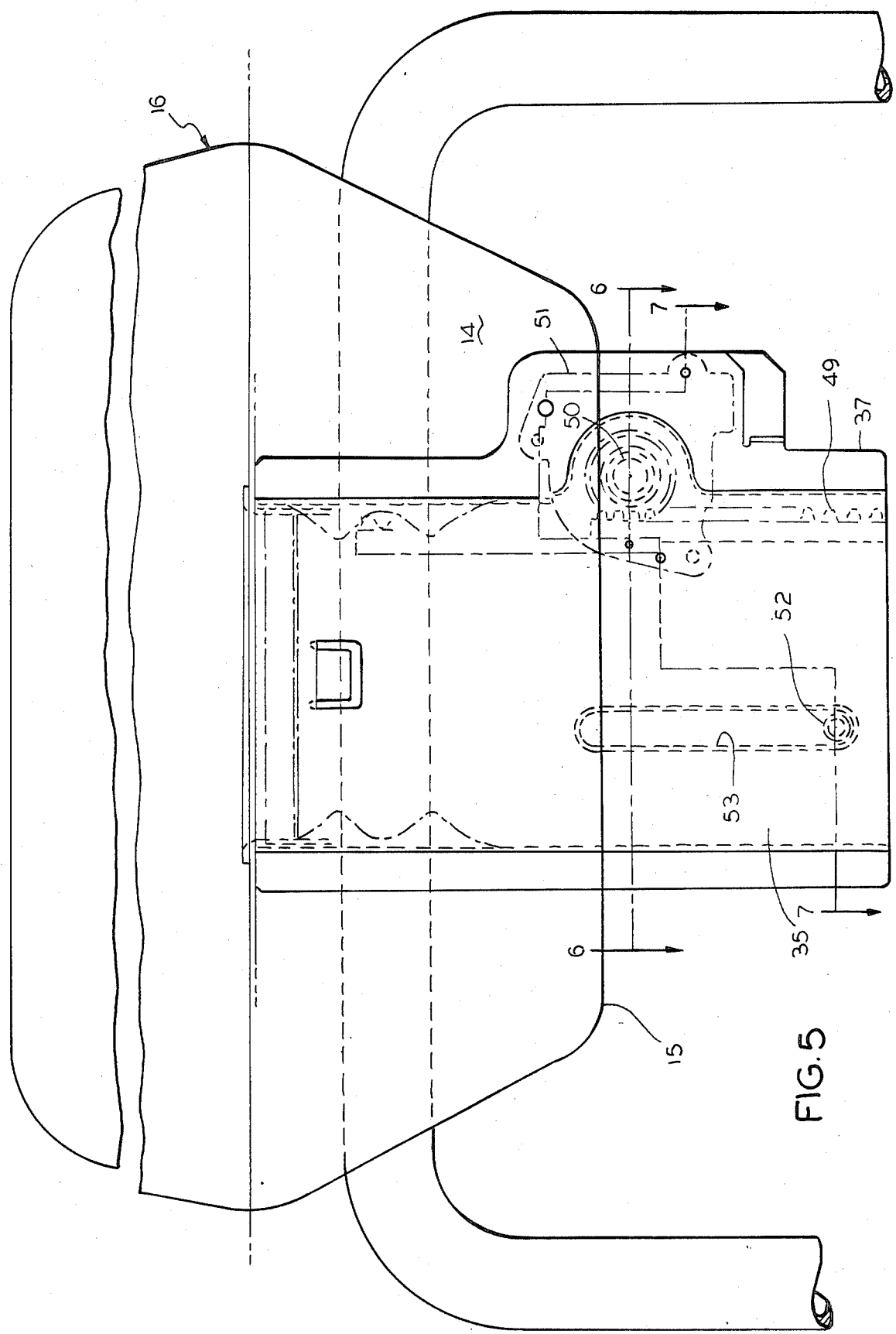
FIG. 5 is a view toward the front of the seat taken in the direction of the arrow A in FIG. 3 with the seatback and headrest cushions removed showing details of the vertical track and drive gear structure.

The mounting frame 21 is provided with a rectangular elongated lower portion 35 that extends down through a mounting bezel 36 at the top of the seatback and is slidably received in a mounting member 37 stationarily affixed interiorly of the seatback. As shown in the drawings, the stationary mounting member 37 is provided with a longitudinal rectangular clearance opening 38 having four spaced apart projections 39, 40, 41, 42 in the form of tongues around its internal periphery. The elongated portion 35 of the mounting frame 21 is provided with four complementary grooves 43, 44, 45, 46 into which the tongues are slidably received. Affixed by a pin 47 along one longitudinal edge 48 of the lower portion 35 of the mounting frame 21 is a linear gear 49. As shown in FIGS. 5 and 6, the linear gear 49 is engaged by a drive gear 50 associated with an operator controlled reversible electric motor 51 which is mounted to the stationary mounting member 37. The slidable tongue and groove track structure defines a linear vertical path of travel for the mounting frame 21 and thus the headrest frame 16 attached thereto and the linear gear 49 and motor drive provides for selectively moving the mounting frame over the vertical track to an infinite number of positions between the fully up and fully down positions as shown in outline in FIG. 3. A stop screw 52 extends from the elongated lower portion 35 of the headrest mounting frame 21 into an elongated clearance slot 53 in the stationary mounting member 37 and engages against the ends of the slot to limit the extend of vertical movement of the mounting frame and thus the headrest.

The bladder assembly 24 is a commerically available item and is provided with a tube 54 that extends into the seat interior preferrable through a central clearance hole 55 in the mounting frame lower portion 35 and connects a gas supply source and associated controls, which do not form a part of the present invention, for expanding and exhausting the bladder. In operation, as the bladder is expanded it pushes against the support plate 23 of the headrest frame 16 causing the headrest frame to move forwardly away from the support plate 22 of the stationary mounting frame 21 over the path of travel defined by the forward-rearward track. When the bladder is exhausted, a spring 56, which is affixed to the mounting frame 21, and acts on the headrest frame 16 in the rearward direction, to the right in FIG. 3, causes the bladder to contract and biases the headrest frame 16 to move in the rearward direction. Appropriate controls mentioned provide for inflating and exhausting the bladder any incremental amount desired so as to position the headrest at any of an infinite number of positions between the fully forward and fully rearward positions.

Having described the preferred embodiment of the invention, those skilled in the art can readily devise other emmbodiments and modifications. Therefore, such other embodiments and modifications are to be considered to be within the scope of the appended claims.

What is claimed is:

1. A headrest for an automotive vehicle seatback comprising:
   first frame means having a generally hollow interior defining a headrest configuration;
   second frame means in said hollow interior of said first frame means including means for mounting said second frame means to said seatback;
   first track means connecting said first frame means to said second frame means providing for movement of said first frame means relative to said second frame means over a first path of movement defined by said first track means in a generally forward and a generally rearward direction relative to said seatback between a fully rearward position and a fully forward position; and
   expansible-contractable means mounted between said first frame means and said second frame means for selectively causing said first frame means to move to any of an infinite number of intermediate positions between said fully rearward position and said fully forward position said first frame means being movable in said forward direction upon expansion of said expansible-contractable means and in said rearward direction upon contraction of said expansible-contractable means.

2. The headrest as claimed in claim 1, wherein said means for mounting said second frame means to said seatback includes second track means providing for movement of said second track means relative to said seatback over a second path of movement defined by said second track means in a generally upwardly and a generally downwardly direction relative to a top portion of said seatback between a fully up position and fully down position.

3. The headrest as defined in claim 2, wherein said expansible-contractable means includes a bladder assembly mounting to said second frame means including an inflatable bladder acting on said first frame means in said forward direction, and
spring means for biasing said first frame means in said rearward direction.

4. The headrest as defined in claim 3, wherein said first track means includes first groove means on an inner surface of at least one of a pair of side portions of said first frame means said first groove means having a configuration defining said first path of movement, and
a protrusion on said second frame means complementary to said first groove means slidably received in said first groove means.

5. The headrest as defined in claim 4, wherein said second track means includes second groove means on a extension portion of said second frame means, and a mounting member including at least one projection complementary to said second groove means slidable received in said second groove means.

6. The headrest as defined in claim 5, wherein said first groove means is arcuate shaped defining a generally pivotable first path of movement and said second groove means is linear defining a linear second path of movement.

7. The headrest as defined in claim 6 wherein said first frame means includes an elongated lower portion extending from the top of said seatback along a forward exterior upper portion of said seatback, said lower elongated portion having a lower transverse edge defining a horizontal pivotable axis about which said first frame means pivots when moved over said pivotable first path of movement.

8. A headrest for an automotive vehicle seatback comprising:
a headrest frame having a hollow interior and an elongated lower front portion extending below a top of said seatback along a portion of a front exterior surface of said seatback defining a lower free edge with said headrest mounted to said seatback;
a mounting frame within said interior of said headrest frame including an elongated portion adapted to be mounted within said seatback;
first track means connecting said headrest frame and said mounting frame providing for movement of said headrest frame relative to said mounting frame in a generally pivotable forward and rearward direction relative to said seatback about said lower free edge;
selectively expansible-contractable bladder means mounted between said mounting frame and said headrest frame;
means biasing said headrest frame against said bladder means; and
second track means on said elongated portion of said mounting frame providing for movement of said mounting frame in a generally upward and downward direction relative of the top of said seatback.

9. The headrest as defined in claim 8, wherein said first track means includes at least one complementary interconnecting relatively slidable groove and projection on said headrest frame and said mounting frame respectively; and
said second track means includes interlocking slidable tongue and groove means on said elongated portion and a mounting frame mounting member which is adapted to be stationarily affixed to said seatback and a linear gear on said elongated portion adapted to be engaged by a reversible drive gear.

10. The headrest as defined in claim 9, wherein said mounting frame and said headrest frame each include a substantially flat plate-like portion, said plate-like portions lying parallel and in spaced apart relationship, and
said bladder means includes a mounting portion affixed to the plate-like portion of said mounting frame, a bladder positioned in the space between said plate-like portions, and a gas supply tube connected to said bladder adapted to be connected to an external gas supply.

11. A headrest for an automotive vehicle seatback comprising:
a headrest frame including an upholstered padded cover, said headrest frame having a lower free edge disposed transversely along an upper front exterior portion of said seatback below the top of said seatback;
a mounting frame including an elongated portion having a linear gear adapted to engage a reversible motor driven gear;
an elongated mounting member adapted to be affixed interiorly of said seatback;
first slidable interlocking tongue and groove means connecting said headrest frame and said mounting frame providing for generally pivotable movement of said headrest frame relative to said mounting frame about said free edge in a substantially forward and rearward direction relative to said seatback;
selective expansible-contractable bladder means between said headrest frame and said mounting frame for moving said headrest frame in said pivotable forward direction when expanded;
spring means for biasing said headrest frame in the pivotable rearward direction when said bladder means is contracted; and
second slidable interlocking tongue and groove means connecting said elongated portion of said mounting frame to said stationary mounting member providing for linear movement of said mounting frame generally upwardly and downwardly relative to said seatback dependant upon the direction of rotation of said reversible motor driven gear.

12. The headrest as defined in claim 9, wherein said elongated portion of said mounting frame is generally rectangular including at least one longitudinal groove, and
said mounting member is an elongated member having a longitudinal rectangular clearance opening and at least one projection extending into said clearance opening, said elongated portion of said mounting frame slidably received in said rectangular clearance opening with said at least one projection in said at least one groove.

13. The headrest as defined in claim 12, wherein there are four equally spaced longitudinal grooves in said elongated portion of said mounting frame and four complementary projections on said mounting member extending into said rectangular clearance opening and received in said longitudinal grooves.

14. A headrest for an automotive vehicle seatback comprising:

first frame means having a generally hollow interior defining a headrest configuration;

second frame means in said hollow interior of said first frame means including means for mounting said second frame means to said seatback;

first track means connecting said first frame means to said second frame means providing for movement of said first frame means relative to said second frame means over a first path of movement defined by said first track means in a generally forward and a generally rearward direction relative to said seatback between a fully rearward position and a fully forward position; said means for mounting said second frame means includes second track means providing for movement of said second track means relative to said seatback over a second path of movement defined by said second track means in a generally upwardly and a generally downwardly direction relative to a top portion of said seatback between a fully up position and fully down position;

expansible-contractable means mounted between said first frame means and said second frame means for selectively causing said first frame means to move to any of an infinite number intermediate positions between said fully rearward position and said fully forward position said expansible-contractable means includes a bladder assembly mounted to said second frame means including an inflatable bladder acting on said first frame means in said forward direction said first frame means being movable in said forward direction upon expansion of said bladder and in said rearward direction up in contraction of said bladder.

* * * * *